US009154242B2

(12) United States Patent
Takagi et al.

(10) Patent No.: US 9,154,242 B2
(45) Date of Patent: Oct. 6, 2015

(54) COMMUNICATION DEVICE AND COMMUNICATION METHOD

(71) Applicant: Panasonic Corporation, Osaka (JP)

(72) Inventors: Kenji Takagi, Ishikawa (JP); Naotake Yamamoto, Osaka (JP); Yosuke Ukita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 141 days.

(21) Appl. No.: 14/116,206

(22) PCT Filed: May 21, 2013

(86) PCT No.: PCT/JP2013/003213
§ 371 (c)(1),
(2) Date: Nov. 7, 2013

(87) PCT Pub. No.: WO2013/175763
PCT Pub. Date: Nov. 28, 2013

(65) Prior Publication Data
US 2014/0179252 A1    Jun. 26, 2014

(30) Foreign Application Priority Data

May 25, 2012 (JP) ................................. 2012-120092

(51) Int. Cl.
H04B 7/14 (2006.01)
H04B 17/00 (2015.01)
H04B 7/08 (2006.01)
H04B 1/16 (2006.01)

(52) U.S. Cl.
CPC .............. *H04B 17/0057* (2013.01); *H04B 1/16* (2013.01); *H04B 7/0805* (2013.01); *H04B 7/0822* (2013.01)

(58) Field of Classification Search
CPC ...... H04W 88/04; H04W 8/005; H04W 92/18
USPC ............... 455/161.3, 422.1, 41.2, 226.2, 272, 455/277.2, 452.2; 370/315, 328, 352, 348, 370/329
See application file for complete search history.

(56) References Cited

U.S. PATENT DOCUMENTS 8,310,978 B2 * 11/2012 Itagaki et al. ................. 370/315
8,724,539 B2 * 5/2014 Itagaki et al. ................. 370/315
(Continued)

FOREIGN PATENT DOCUMENTS

JP    8-256162    10/1996
JP    9-219674    8/1997
(Continued)

OTHER PUBLICATIONS

International Search Report issued Jul. 9, 2013 in corresponding International Application No. PCT/JP2013/003213.

*Primary Examiner* — Sonny Trinh
(74) *Attorney, Agent, or Firm* — Wenderoth, Lind & Ponack, L.L.P.

(57) ABSTRACT

A communication device includes: a first antenna and a second antenna; a switch unit selecting the first antenna in a first term and the second antenna in a second term; a reception determination unit determining whether or not communication data contained in wireless signals received by the first antenna and the second antenna; and a storage unit storing association between each of communication terminals and one of the first antenna and the second antenna, in which the switch unit sets lengths of the first and second terms so that a ratio of the respective lengths of the first and second terms is equal to a ratio of the number of times the communication data from the communication terminals respectively associated with the first and second antennas and is determined to be successfully obtained.

11 Claims, 15 Drawing Sheets

(56) References Cited

U.S. PATENT DOCUMENTS

2005/0135305 A1* 6/2005 Wentink .................. 370/329
2007/0008922 A1* 1/2007 Abhishek et al. ............ 370/329

FOREIGN PATENT DOCUMENTS

| JP | 2003-18055 | 1/2003 |
| JP | 2011-147065 | 7/2011 |

* cited by examiner

FIG. 5A

| | Optimal antenna in access point | The number of times of successful reception / day |
|---|---|---|
| Station A | Antenna 2 | 2 |
| Station B | Antenna 2 | 3 |
| Station C | Antenna 2 | 4 |
| Station D | Antenna 1 | 20 |

T501

COMMUNICATION DEVICE AND COMMUNICATION METHOD

TECHNICAL FIELD

The present invention relates to a communication device and a communication method.

BACKGROUND ART

In recent years, wireless communication more convenient than a traditional wire communication has been focused besides the traditional wire communication. The wireless communication may use a technique (an antenna diversity technique) in which a plurality of antennas are used in the communication for expanding a communication area or suppressing effect from an interference wave.

In a receiver antenna diversity technique for receiving wireless signals using one of a plurality of antennas, the antennas which can receive radio waves successfully may be different from one another for every communication partner. For the occasion, in order to successfully receive wireless signals from a plurality of communication partners, antennas which can successfully receive the wireless signals from the communication partners should be used for receiving the wireless signals at timings when the communication partners send the wireless signals.

A technique is disclosed that a communication device initializes antennas based on an received signal strength indicator (RSSI) so as to share communication timings between the communication device and a communication terminal, when the communication terminal (station) initializes registration for establishing a channel to the communication device (access point) (Patent Literature (PTL) 1, for example).

In addition, a technique is disclosed that an antenna in a access point having a reception level lower than or equal to a threshold value is eliminated from candidates of antennas to be used for reception (for example PTL 2).

CITATION LIST

Patent Literature

[PTL 1] Japanese unexamined patent application publication No. 2011-147065
[PTL 2] Japanese unexamined patent application publication No. 9-219674

SUMMARY OF INVENTION

Technical Problem

Unfortunately, in a receiver antenna diversity technique, wireless signals are not always received successfully when communication partners send the wireless signals at arbitrary timings.

In view of the above, the present invention provides a communication device and so on with which wireless signals can be received with high probability when communication partners send the wireless signals at arbitrary timings in the receiver antenna diversity technique.

Solution to Problem

In view of the above, a communication device according to an aspect of the present invention includes: a first antenna and a second antenna which receive wireless signals sent by a plurality of communication terminals, the wireless signals containing communication data; a selection unit configured to select the first antenna in a first term, and the second antenna in a second term different from the first term; a reception determination unit configured to determine whether or not the communication data contained in the wireless signals received by a selected one of the first antenna and the second antenna selected by the selection unit is successfully obtained; and a storage unit which stores association between each of the communication terminals and one of the first antenna and the second antenna, in which the selection unit is configured to set a length of the first term and a length of the second term by referring to the association, the length of the first term and the length of the second term being set to make a ratio of the length of the second term to the length of the first term equal to a ratio of the number of times the communication data sent by the communication terminal associated with the second antenna is determined to be successfully obtained, to the number of times the communication data sent by the communication terminal associated with the first antenna is determined to be successfully obtained.

These general and specific aspects may be implemented using a system, a method, an integrated circuit, a computer program, or a computer-readable recording medium such as a CD-ROM, or any combination of systems, methods, integrated circuits, computer programs, or computer-readable recording media,

Advantageous Effects of Invention

A communication device according to an aspect of the present invention can receive a wireless signal at high probability.

BRIEF DESCRIPTION OF DRAWINGS

FIG. 5A is a diagram which shows an example of an antenna selection ratio aggregation table according to the embodiment.

DESCRIPTION OF EMBODIMENTS

Figure 1:
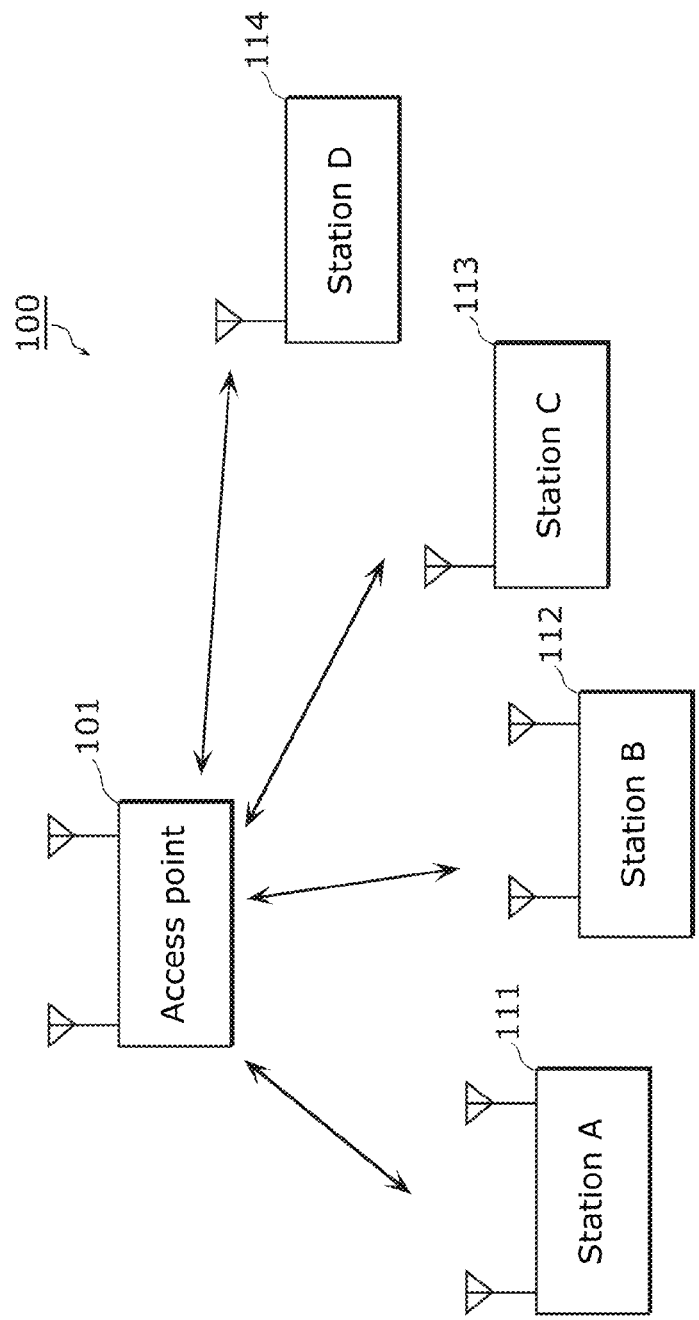
FIG. 1 is a diagram which shows an example of a system configuration according to an embodiment.

Underlying Knowledge Forming Basis of the Present Disclosure

Inventors of the present invention found that the receiver antenna diversity technique described in a section of "Background art" includes problems described below.

In the receiver antenna diversity technique for receiving wireless signals using one of a plurality of antennas, antennas which can successfully receive wireless signals may differ from one another according to communication partners. In this case, for successful reception of the wireless signals from a plurality of communication partners, antennas should be prepared which can successfully receive the wireless signals from the communication partners at timings when the communication partners send wireless signals.

When each of the communication partners sends a wireless signal to a communication device at arbitrary timings, the communication device may not be prepared to receive the wireless signals sent by the communication partners, using an antenna which can successfully receive the wireless signals. If the communication device is not prepared for receiving the wireless signals using the antenna which can successfully receive the wireless signals, another antenna that is not the antenna capable of successfully receiving the wireless signals sent by the communication partner is used to receive the wireless signals. For the occasion, the wireless signals may not be received normally.

A technique is disclosed that when communication terminals (stations) initialize registration for establishing channels to a communication device (access point), the communication device initializes antennas based on RSSIs so as to share communication timings with the communication terminals (for example, PTL 1).

According to the technique disclosed in PTL 1, the communication timings are shared between the communication terminals and the communication device in advance, thereby enabling the communication device to receive wireless signals using an antenna which can successfully receive the wireless signals sent by each of the communication terminals at timings when each of the communication terminals sends the wireless signal. Here, the communication timings should be shared between the respective communication terminal and the communication device in advance. This prevents the technique disclosed in PTL 1 from supporting a case when each of the communication terminals sends wireless signals at arbitrary timings.

A technique is disclosed for eliminating, from candidates for antennas to be used for receiving wireless signals, an antenna whose reception level in a communication device is lower than or equal to a threshold value, when a communication terminal initializes registration with respect to the communication device (for example, PTL 2).

According to the technique disclosed in PTL 2, possibility of selecting the antenna which can successfully receive wireless signals increases upon selection in receiver antennas in the communication device, to thereby increase the probability of successful reception of the wireless signals. However, this technique does not assume communication between the communication device and a plurality of communication terminals.

In view of the above, a communication device according to an aspect of the present invention includes: a first antenna and a second antenna which receive wireless signals sent by a plurality of communication terminals, the wireless signals containing communication data; a selection unit configured to select the first antenna in a first term, and the second antenna in a second term different from the first term; a reception determination unit configured to determine whether or not the communication data contained in the wireless signals received by a selected one of the first antenna and the second antenna selected by the selection unit is successfully obtained; and a storage unit which stores association between each of the communication terminals and one of the first antenna and the second antenna, in which the selection unit is configured to set a length of the first term and a length of the second term by referring to the association, the length of the first term and the length of the second term being set to make a ratio of the length of the second term to the length of the first term equal to a ratio of the number of times the communication data sent by the communication terminal associated with the second antenna is determined to be successfully obtained, to the number of times the communication data sent by the communication terminal associated with the first antenna is determined to be successfully obtained.

With this, the communication device (access point) determines time periods during which respective two receiver antennas are used so that a ratio of the respective time periods is equal to a ratio of the number of times that the communication data from the communication terminals (stations) is determined to be successfully obtained. The ratio of the respective time periods for using a corresponding one of the receiver antennas is coincident with the ratio of the number of terminals whose wireless signals are to be successfully received by the respective receiver antennas, thereby increasing the ratio of successful reception of the communication data. Accordingly, the wireless signals can be received with high probability when the communication terminals send wireless signals at arbitrary timings.

For example, the communication device further includes a received signal strength indicator (RSSI) detection unit configured to detect RSSIs of the wireless signals received by the respective first antenna and the second antenna, in which the storage unit stores the association between the communication terminal which is a source terminal for sending a wireless signal and one of the first antenna and the second antenna that receives a wireless signal having a higher one of the RSSIs detected by the RSSI detection unit.

With this, each of the communication terminals is associated with an antenna which receives the wireless signal having higher RSSI among two receiver antennas, increasing possibility of receiving the wireless signals from each of the communication terminals using the antenna which receives the wireless signal having the high RSSI. Accordingly, the wireless signals can be received with high probability when the communication terminals send wireless signals at arbitrary timings, The selection unit is configured to repeat the first term and the second term in a cycle.

With this, when the communication device is continuously employed, two receiver antennas can be used by being switched for the predetermined time periods under the condition that the time periods for using the respective two receiver antennas are set to the aforementioned ratio. Thus, the effect of the present invention can be continuously exerted.

The selection unit is configured to update a repeat cycle for the first term and the second term, based on the number of times that the communication data sent by the communication terminal associated with the first antenna is determined to be successfully obtained and the number of times that the communication data sent by the communication terminal associated with the second antenna is determined to be successfully obtained.

With this, if a communication terminal is used whose communication data amount significantly varies, the selection of the receiver antenna in the access point can be performed along the variation of the communication data amount of the communication terminal.

For example, the selection unit is configured to, when one of the RSSIs of the wireless signals received by one of the first antenna and the second antenna is lower than a predetermined value, set the length of the first term and the length of the second term based on the number of times that the communication data sent by the source terminal for sending the wireless signal is determined to be successfully obtained.

With this, if the communication data sent from a station can be received by one of the receiver antennas in the access point, a selection ratio in the receiver antennas in the access point is determined based on the communication data amount of the station, in other words, only the stations which require the selection in the receiver antennas in the access point can be included in a calculation of the selection ratio in the receiver antennas in the access point.

For example, the selection unit is configured to, when one of the RSSIs of the wireless signals received by the respective first antenna and the second antenna is higher than or equal to a predetermined value, set the length of the first term and the length of the second term without including the number of times that the communication data sent by the source terminal for sending the wireless signal is determined to be successfully obtained.

With this, if the communication data sent by the stations can be received by all of the receiver antennas in the access point, the selection ratio in the receiver antennas in the access point can be determined regardless of the communication data amount of each of the stations. In other words, only the stations which require the selection in the receiver antennas in the access point can be included in the calculation of the selection ratio in the receiver antennas in the access point.

For example, the storage unit is configured to store, as new association, the association between the communication terminal and one of the first antenna and the second antenna that receives the wireless signal which has the higher one of the RSSIs, upon receiving the communication data sent by the communication terminal.

With this, the receiver antenna which receives the wireless signal having the higher RSSI can be selected at every interval for switching in the receiver antennas. In other words, even if the RSSI temporally varies, the access point can select the receiver antenna optimal for the receiving. The cases where the RSSI temporally varies include a case in which the station moves, a case in which a peripheral communication environment of the station varies though the station is at rest, or other cases.

For example, the selection unit is configured to set the length of the first term and the length of the second term under a condition that retransmission latency for the communication terminal to retransmit the communication data is set as a repeat cycle.

With this, if the access point does not select the optimal receiver antenna for receiving the communication data sent by a station at a time when the station sends the communication data, and the communication data cannot be received, a time period from a time point of switching in the receiver antennas in the access point to a time point of receiving the retransmitted communication data can be shortened by switching in the receiver antennas in the access point. Thus, the probability that the access point can receive the communication data from stations can be increased.

For example, the selection unit is configured to keep selection of the first antenna or selection of the second antenna during reception of the wireless signals by the first antenna or the second antenna.

With this, communication loss occurring at the switching in the receiver antennas during receiving the wireless signals can be avoided.

A communication method according to an aspect of the present invention is for use in a communication device including a first antenna and a second antenna for receiving wireless signals which contain communication data and are sent by a plurality of communication terminals. The communication method includes: selecting the first antenna in a first term, and the second antenna in a second term different from the first term; determining whether or not the communication data contained in the wireless signals received by a selected one of the first antenna and the second antenna selected in the selecting is successfully obtained; and associating each of the communication terminals with one of the first antenna and the second antenna, in which in the selecting, with reference to association in the associating, a length of the first term and a length of the second term are set to make a ratio of the length of the second term to the length of the first term equal to a ratio of the number of times the communication data sent by the communication terminal associated with the second antenna is determined to be successfully obtained, to the number of times the communication data sent by the communication terminal associated with the first antenna is determined to be successfully obtained.

With this, the effect same with that in the communication device can be obtained.

A program according to an aspect of the present invention causes a computer to execute the aforementioned communication method.

With this, the effect same with that in the communication device can be obtained, Hereinafter, the communication device according to an aspect of the present invention is specifically described with reference to drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements, The same reference signs are allocated to the same structural elements, and description thereof may be omitted.

Embodiment

In a communication device having therein two receiver antennas to be switched using a receiver antenna diversity technique, an example for improving a probability of receiving wireless signals sent at arbitrary timings is described according to the present embodiment. An example of wireless communication standards is IEEE 802.15.4. The present invention can be applied to other wireless communication standards, FIG. 1 is a diagram which shows an example of a system configuration according to the present embodiment.

The communication system 100 shown in FIG. 1 includes a access point 101, a station A (111), a station B (112), a station C (113), and a station D (114). The access point 101 receives communication data from the respective station A (111), station B (112), station C (113), and station D (114). The access point 101 switches between the receiver antennas using the receiver antenna diversity technique. The station may have a single antenna, and may have a plurality of antennas to be switched by the diversity technique. The access point 101 is an example of the communication device according to the present invention. The respective stations A to D show examples of the communication terminals.

Figure 2:
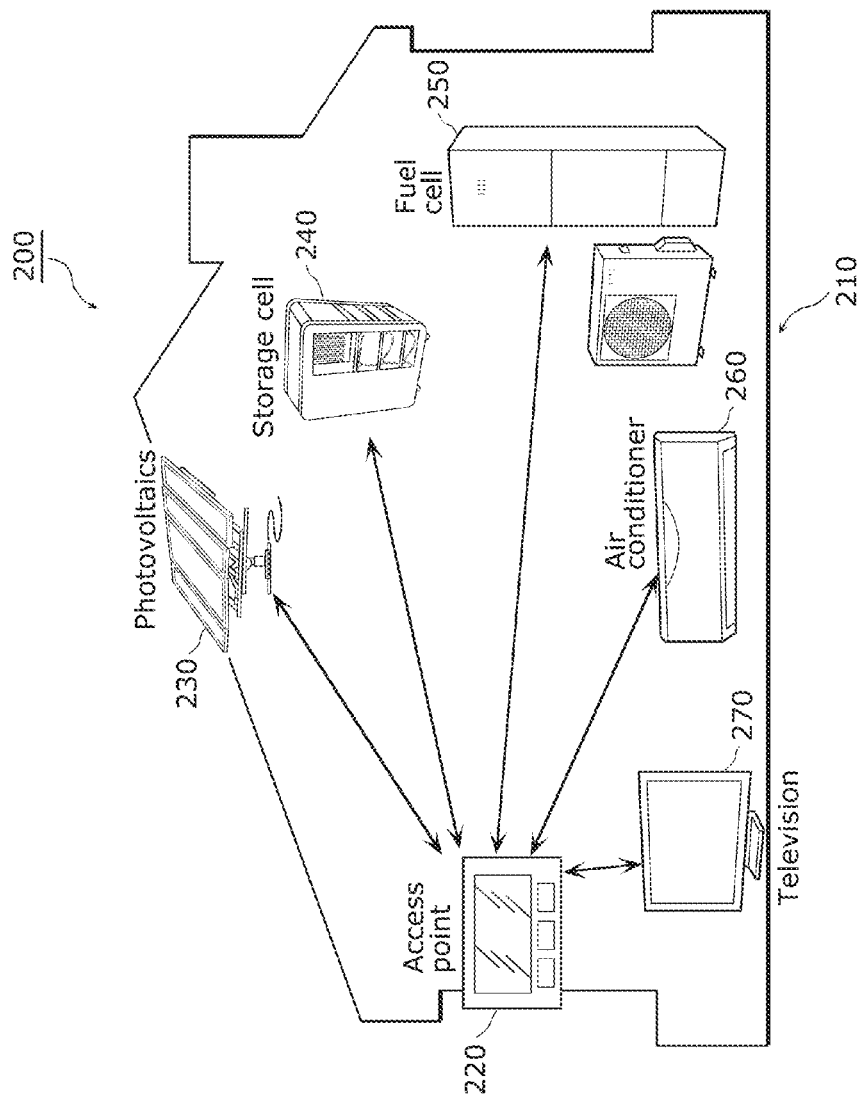
FIG. 2 is a diagram which shows another example of the system configuration according to the embodiment.

FIG. 2 is a diagram which shows an example of a system configuration according to the present embodiment.

The communication system 200 shown in FIG. 2 is a domestic network 210 established in ordinary homes, and includes a access point 220, photovoltaics 230, a storage battery 240, a fuel cell 250, an air conditioner 260, and a television 270. Respective household electric appliances including the photovoltaics 230, the storage battery 240, the fuel cell 250, the air conditioner 260, and the television 270 show examples of the stations having a wireless communication function.

Figure 3:
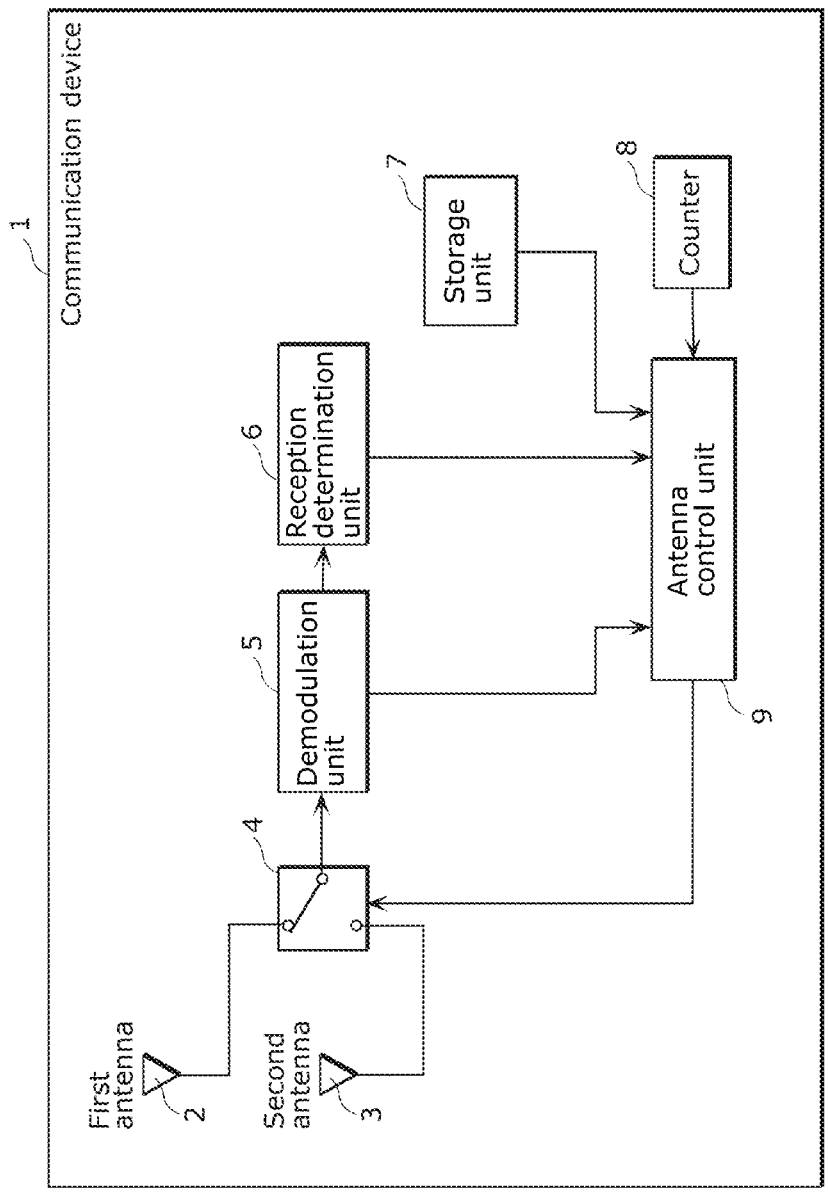
FIG. 3 is an exemplary diagram which shows a functional block configuration of a communication device according to the embodiment.

FIG. 3 is a diagram which shows an example of a system configuration of the communication device according to the present embodiment.

As shown in FIG. 3, the communication device 1 according to the present embodiment includes a first antenna 2, a second antenna 3, a switch unit 4, a demodulation unit 5, a reception determination unit 6, a storage unit 7, a counter 8, and an antenna control unit 9.

The first antenna 2 and the second antenna 3 serve as reception antennas for receiving wireless signals which contain the communication data and are sent by stations.

The switch unit 4 is used for selecting one of the first antenna 2 and the second antenna 3 to output wireless signals received by the selected receiver antenna to the demodulation unit 5.

The demodulation unit 5 demodulates the wireless signals outputted from the switch unit 4 among wireless signals received by the first antenna 2 and the second antenna 3, so as to reproduce the communication data. The demodulation unit 5 also detects the RSSI of the received wireless signals. It should be noted that the demodulation unit 5 corresponds to an RSSI detection unit.

The reception determination unit 6 determines whether or not the communication data reproduced by the demodulation unit 5 is successfully obtained. To be specific, the reception determination unit 6 determines whether or not the communication data sent by stations can be received with no error, using an error detection code provided in the communication data by the station. A specific example of the error detection code is cyclic redundancy check (CRC).

The storage unit 7 stores association between a station and a receiver antenna (the first antenna and the second antenna) capable of successfully communicating with the station. The storage unit 7 also stores the number of times of successful reception which is the number of communication data items received by the reception determination unit with no error, The counter 8 holds numeral values (counter values) which are added at every passage of a certain time period.

The antenna control unit 9 controls the switch unit 4 to be used for selection of either the first antenna 2 or the second antenna 3. The antenna control unit 9 performs control at predetermined intervals based on the counter values in the counter 8.

It should be noted that respective functions of the switch unit 4 and the antenna control unit 9 correspond to a selection unit.

A processor (not shown) for interpreting content of communication data received from stations so as to perform information processing may be included, in this case, the received data which the reception determination unit 6 determines to successfully obtain is outputted to the processor.

The content of the communication data may be outputted to a processing device (not shown) which interprets the content of the communication data received from stations to perform the information processing. In this case, the received data which the reception determination unit 6 determines to successfully obtain is outputted to the processing device.

Figure 4A:
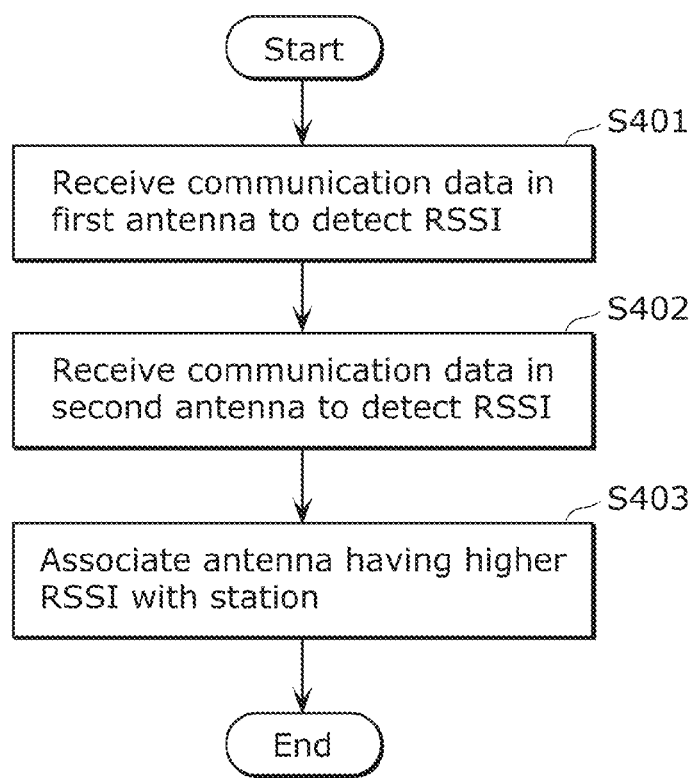
FIG. 4A is a flowchart which shows an association operation on receiver antennas of the communication device according to the embodiment.

Operations of the communication device according to the present embodiment are described in the following. The operations of the communication device according to the present embodiment include association of the receiver antennas, update of a counter, reception of packets, and other operation. These operations may be implemented in parallel, FIG. 4A is a flowchart which shows operations, such as the association of the receiver antennas in the communication device according to the present embodiment. The operation is performed at timings, such as, a timing immediately after start-up of the station, at a predetermined time point, a timing after a predetermined time period has passed from the previous same operation, or other timings. The station corresponds to any one of the stations A to D shown in FIG. 1.

When the operation is implemented, a station sends the communication data for associating one of the receiver antennas in the access point with the station. The communication data may be sample communication data which does not include significant data, or may be communication data which includes significant data.

As shown in FIG. 4A, in the operation of the association performed on the receiver antennas in the communication device according to the present embodiment, the access point first receives, with the first antenna, communication data sent by a station, and detects an RSSI (Step S401).

Next, the access point receives, with the second antenna, the communication data sent by the station, and detects an RSSI (Step S402).

Then, the access point compares the RSSI obtained using the first antenna with the RSSI obtained using the second antenna, and performs association on the receiver antenna with the higher RSSI as the receiver antenna optimal for communicating with the station. This association is stored in an antenna selection ratio aggregation table (described later).

In Steps S401 and S402, a plurality of communication data items sent from the stations may be received, and an average value of the RSSIs obtained in the receiver antennas may be used to implement the association in Step S403.

Furthermore, the association in Step S403 may not be implemented on a station having the RSSI which is more than or equal to a predetermined RSSI value according to detection in Steps S401 and S402. This is because that the communication data can successfully be received by the access point using either one of the receiver antennas, so that the selection in the receiver antennas is not required. In addition, such station is eliminated from the selection in the receiver antennas, to increase the provability of receiving the communication data with the optimal receiver antenna for the station the communication data from which can be successfully received using only one of the receiver antennas.

The association in Step S403 may not be it implemented on a station having packet error rates (PERs) of the communication data items received in Steps S401 and S402, which are more than or equal to a predetermined PER, similar to a case of the aforementioned station with the RSSI more than or equal to a predetermined RSSI. The reason is the same with that in the case of the aforementioned station with the RSSI.

The operation, such as the association on the receiver antenna, is implemented periodically, thereby increasing the possibility that the access point can select the optimal receiver antenna. This is because that a reception status of the communication data in the access point varies with variation in a radio wave environment due to movement of things or people or other factors, and the optimal receiver antenna changes along with the variation.

Figure 4B:
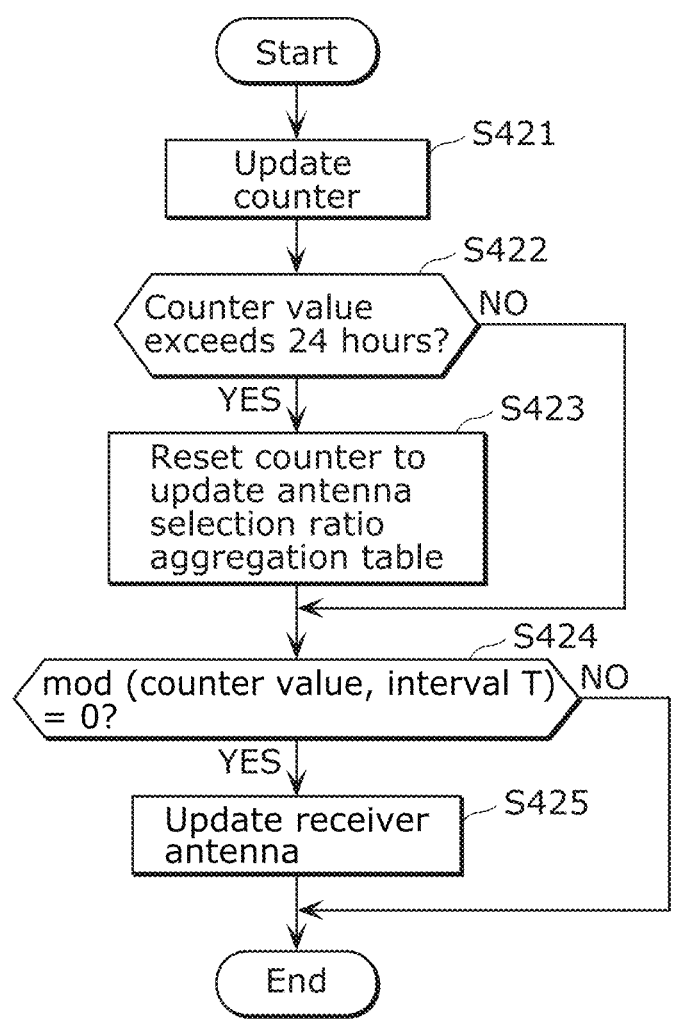
FIG. 4B is a flowchart which shows an updating operation on a counter of the communication device according to the embodiment.

FIG. 4B is a flowchart which shows an operation, such as the update of the counter, of the communication device according to the present embodiment. This operation is implemented periodically. An interval T in which the communication device changes the selection in the receiver antennas is determined in advance.

As shown in FIG. 4B, a counter value is first updated in a counter updating operation in the communication device according to the present embodiment (Step S421).

Subsequently, it is determined whether or not the counter value updated in Step S421 exceeds a counter value that corresponds to 24 hours (Step S422). Here, though a time period for resetting the counter value is assumed to be 24 hours, the time period may be a predetermined time period.

In Step S422, if the counter value is determined to exceed the counter value corresponding to 24 hours (YES in Step S422), the counter value is reset and the antenna selection ratio aggregation table is updated (Step S423). In addition, a schedule for selecting the receiver antenna is determined as follows, based on the antenna selection ratio aggregation table.

The determination on the schedule for selecting the receiver antenna requires to first calculate a ratio S of the number of times of the successful reception by the station associated with the second antenna with respect to the number of times of the successful reception by the station associated with the first antenna. Then, a ratio of duration time (a second term) during which the switch unit 4 is used to select the second antenna with respect to duration time (a first term) during which the switch unit 4 is used to select the first antenna is set to be equal to the ratio S. Subsequently, the duration time and the selection schedule for the first term and the second term are determined. The selection schedule is information for determining a starting time and an ending time for each of the first and second terms. Lastly, the receiver antenna to be subsequently selected is determined in accordance with the selection schedule. It should be noted that specific examples of the selection schedule are described later.

Next, it is determined whether or not the counter value is an integral multiple of the interval T, i.e., whether or not the below-shown expression 1 is satisfied (Step S424).

$$\text{mod}(\text{counter value, interval } T) = 0 \qquad \text{(expression 1)}$$

If the counter value is determined to be a value corresponding to the integral multiple of the interval T in Step S424, the receiver antenna is selected based on the selection schedule for each of the receiver antennas. It should be noted that a specific value of the interval T may be any value as long as the value which serves as the interval for resetting the aforementioned counter value corresponds to a time period less than 24 hours. For example, the interval T can be a value corresponding to one hour, ten minutes, one minute, or the like. Furthermore, the interval T may be changed upon switching between the receiver antennas.

Figure 4C:
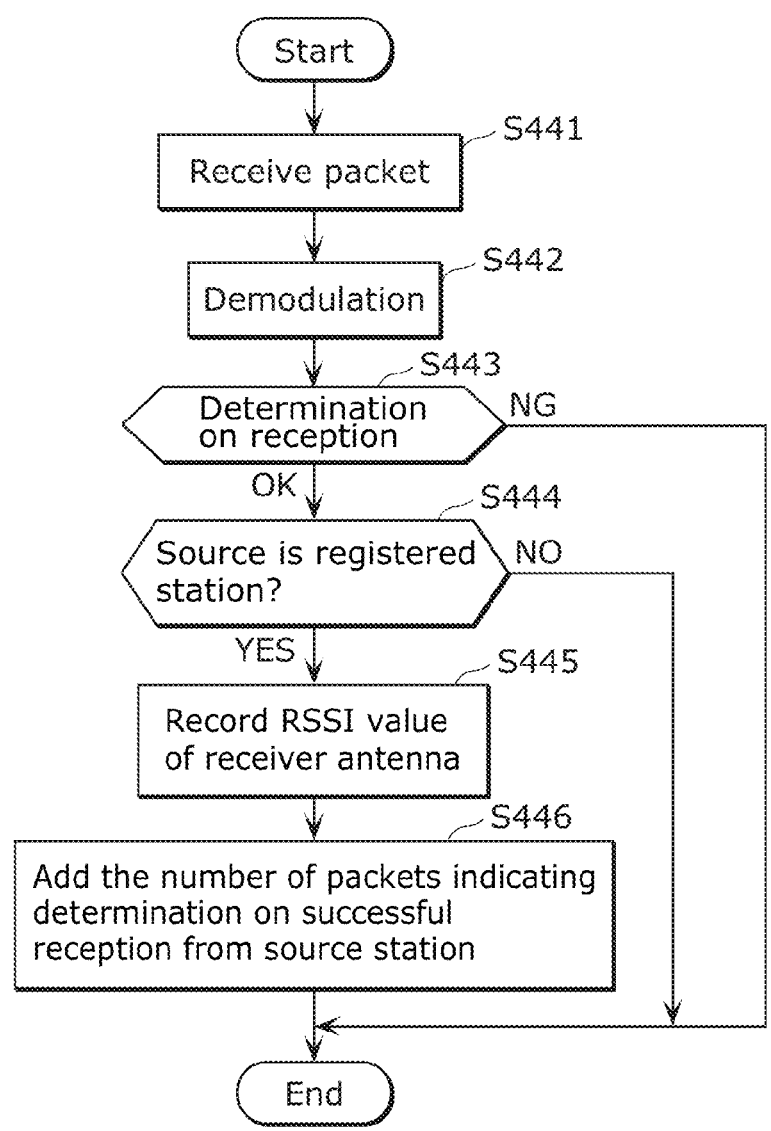
FIG. 4C is a flowchart which shows a packet reception operation in the communication device according to the embodiment.

FIG. 4C is a flowchart which shows an operation, such as reception of packets, in the communication device according to the present embodiment. This operation is implemented periodically. The RSSI value of the communication data sent from a station is previously registered in the storage unit 7 for each of stations which send the communication data to the communication device.

As shown in FIG. 4C, a wireless signal (packet) sent from a station is first received in the operation, such as the reception of packets (Step S441), in the communication device according to the present embodiment. If stations send no wireless signals, the communication device waits to receive wireless signals.

Then, the received wireless signals are demodulated to copy the communication data (Step S442).

Subsequently, it is determined whether or not the communication data copied in Step S422 is successfully obtained (Step S443). To be specific, it is determined whether or not the communication data sent by a station can be received with no error, using the error detection code provided in the communication data by the station. A specific example of the error detection code is the CRC. If it is determined that the communication data cannot be obtained successfully in Step S443, the processing is terminated (NG in Step S443), In contrary, if it is determined that the communication data can be obtained successfully, it is determined whether or not the communication data is sent from one of registered stations (Step S444).

If it is determined that the communication data is sent from the registered station (YES in Step S444), the RSSI value of the receiver antenna is recorded (Step S445).

On the other hand, if it is determined that the communication data is sent from a non-registered station in Step S444 (NO in Step S444), the processing is terminated. It should be noted that an average RSSI value among RSSI values of the respective receiver antennas is stored in the storage unit 7 for each of stations, Then, the storage unit 7 adds the number of times of successful reception which is the number of the communication data items received with no error from the station (source household appliance) that sent the communication data (Step S446).

FIG. 5A is a diagram which shows an example of the antenna selection ratio aggregation table 1501 according to the present embodiment.

As shown in FIG. 5A, the antenna selection ratio aggregation table T501 describes stations, the receiver antennas in the access point optimal for receiving wireless signals sent by each of the stations, and the number of times of the successful reception of the wireless signals sent by each of the station (the number of times of determination on the successful reception by the reception determination unit 6). A receiver antenna in the access point, which is optimal for receiving wireless signals sent by a station, is the receiver antenna which was associated with the station in Step S403 in FIG. 4A. The number of times of the successful reception of the wireless signals sent by the station is the number which was added in Step S446 in FIG. 4C. Although the number of times the wireless signals sent by the station are successfully received shows values for one day (24 hours), this is an example and the value may be for other time periods.

The description is given to the selection in antennas for each case regarding the successful reception shown in FIG. 5A.

The sum of the number of the successful reception for each of the receiver antennas, which is shown in FIG. 5A, is 20 and 9 for the respective antenna 1 (first antenna) and antenna 2 (second antenna). Accordingly, the ratio S of the successful reception is 0.45 (=9/20). Then, time period is allocated to the first term and the second term so that the ratio of the duration of the second term with respect to the duration of the first term is equal to the ratio S, in the interval T. For example, if the interval T indicates one minute, the first term has about 41 seconds and the second term has about 19 seconds. It should be noted that rounding may be appropriately performed in the above calculation. In the calculation, for example, the rounding may be used to allow the ratio S to be 0.5, so that the first term has 40 seconds, and the second term has 20 seconds.

Figure 5B:
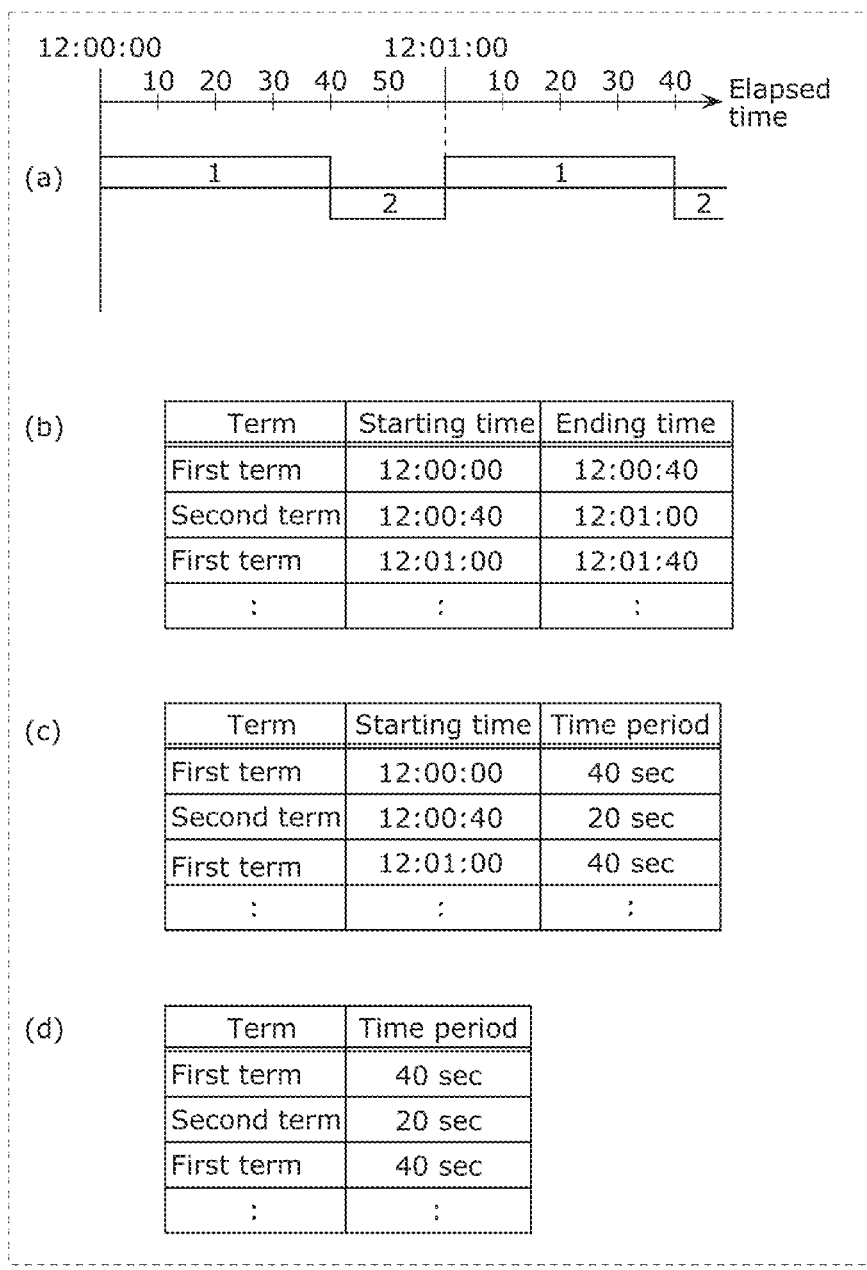
FIG. 5B is a diagram which shows an example of an antenna selection schedule according to the embodiment

FIG. 5B is a diagram which shows an example of the schedule for selecting the antenna, according to the present embodiment. If it is determined that the first term has 40 seconds and the second term has 20 seconds in FIG. 5A, the selection in the antennas for each of time points is shown in (a) of FIG. 5B, for example. As shown in the (a) of FIG. 5B, the first term starts at the predetermined time (12:00:00), and the second term starts at the time (12:00:40) which is 40 minutes after the starting time of the first term. After further 20 seconds (12:01:00), the first term starts. After that, the first term and the second term repeat in the same manner.

For the occasion, the selection schedule includes, for example, any one of information items shown below.

In an example shown in (b) of FIG. 5B, the selection schedule is information which includes the starting times and the ending times for the respective periods (first term and second term). In the case shown in the (b) of FIG. 5B, the period starts at the starting time and terminates at the ending time.

In an example shown in (c) of FIG. 5B, the selection schedule is information which includes the starting times and necessary time periods for the respective terms. In the case shown in the (c) of FIG. 5B, the respective terms start at the starting times and terminate at the times after the necessary time periods elapse.

In an example shown in (d) of FIG. 5B, the selection schedule is information which includes duration time periods for the respective first and second terms. Here, the information shown in the (d) of FIG. 5B can only be used on the assumption that the second term starts immediately after the first term terminates. In the case shown in the (d) of FIG. 5B, the term starts at the predetermined time and terminates after the necessary time period elapses, and then, the next term starts at the same time with the ending time of the necessary time period for the term which started at first.

Figure 6:
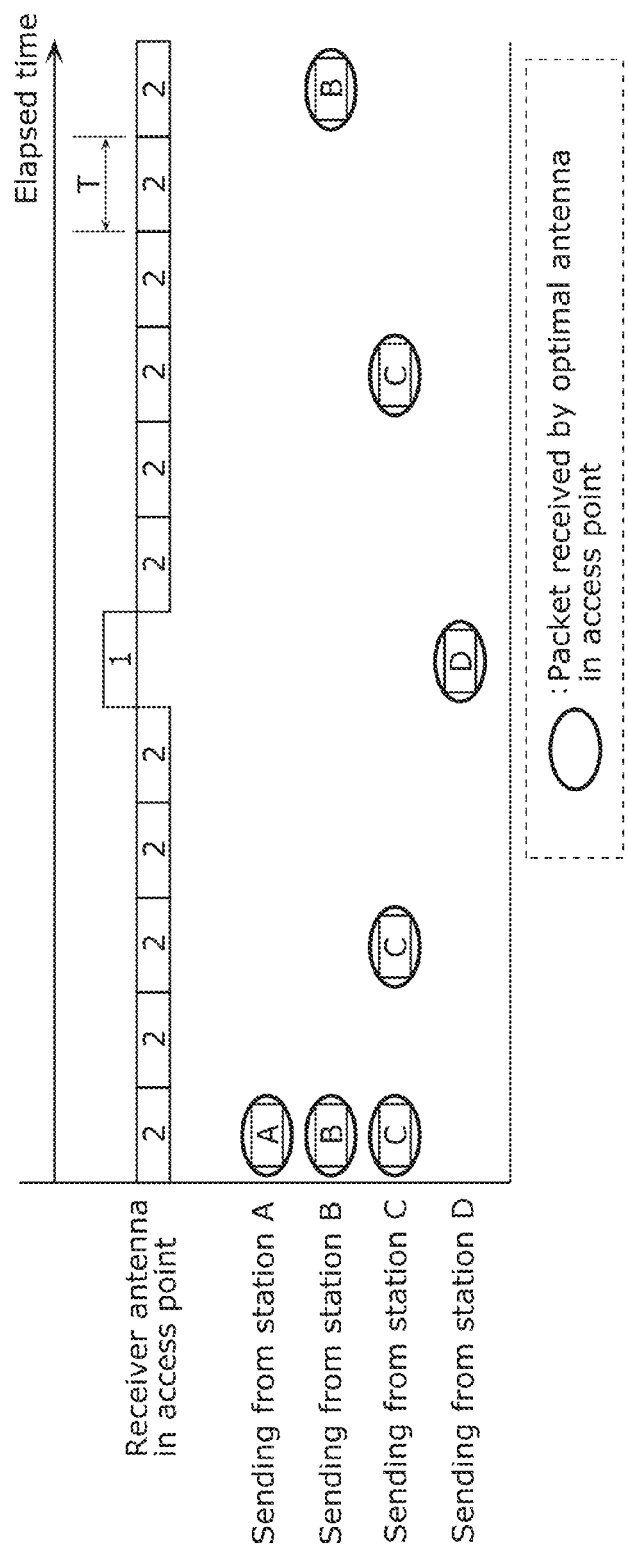
FIG. 6 is a diagram which shows an example of a selection of a receiver antenna in an access point, for describing a problem to be solved in the present invention.

The following describes that the selection in the receiver antennas using the aforementioned operations increases an amount of the communication data which can be received by the access point, FIG. 6 is a diagram which shows an example of the selection in the receiver antennas in the access point, for describing a problem to be solved in the present invention. FIG. 6 shows an example of a case in which a communication timing is shared by the access point and the station, and the station communicates at a communication timing which has been determined in advance. The stations A, B, and C are associated with the second antenna in the access point, while the station D is associated with the first antenna in the access point, Consideration is given to the case where the communication timing is shared between the access point and the stations, as shown in FIG. 6. In this case, if it is assumed that propagation property does not vary, the probability that the access point receives the communication data (reception ratio) is 100%. However, the communication can be implemented only at predetermined communication timings. This raises a problem that the station cannot send communication data at arbitrary timings.

Figure 7:
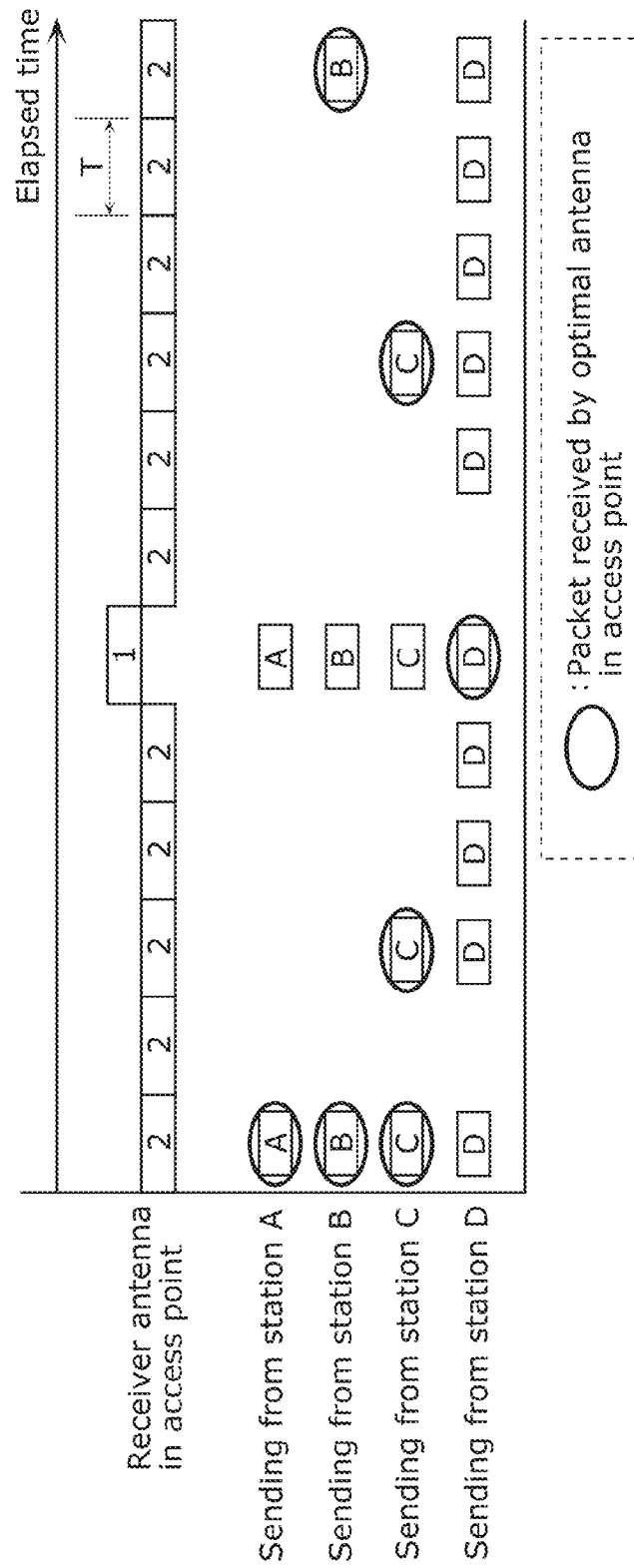
FIG. 7 is a diagram which shows another example of a selection of a receiver antenna in the access point, for describing a problem to be solved in the present invention.

FIG. 7 is a diagram which shows another example of the selection in the receiver antennas in the access point, for describing a problem to be solved in the present invention. FIG. 7 shows an example of a case in which a communication timing is shared by the access point and the stations, and the station communicates at arbitrary timings which are not the previously determined communication timings.

Communication by the station at arbitrary timings as shown in FIG. 7 decreases the probability that the access point can receive the communication data sent under a situation where the receiver antenna not optimal for the communication with the salve station is selected. In an example shown in FIG. 7, the reception ratio of the access point decreases to 36%.

Figure 8:
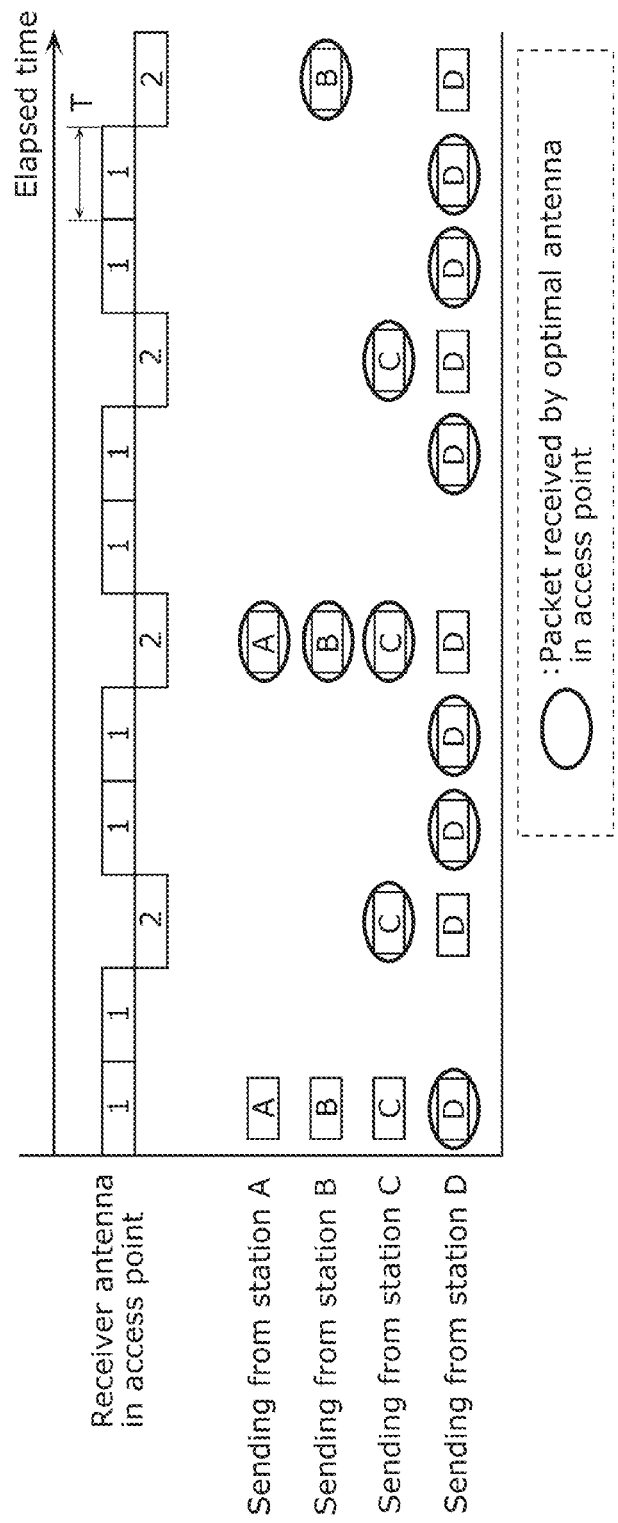
FIG. 8 is a diagram which shows an example of a selection of a receiver antenna in the access point according to the embodiment.

FIG. 8 is a diagram which shows an example of the selection in the receiver antennas in the access point according to the embodiment. FIG. 8 shows an example, in the same manner as the example shown in FIG. 7, of the selection in the receiver antennas in the access point according to the present embodiment, when the stations communicate at arbitrary timings.

The ratio that the access point selects the first antenna or the second antenna as the receiver antenna approximately coincides with the ratio of the number of the communication data items optimal to be received by the first antenna or the second antenna. Therefore, more communication data can be received by the access point than that in the case shown in FIG. 7. As a result, the reception ratio of the access point increases to 63%.

Although an interval for resetting the counter is set to 24 hours in FIG. 4B, the interval can be set a predetermined time period. The time period is shortened, thereby supporting, in shorter cycles, communication in which the amount of the communication data increases or decreases. For example, if the time period is set to be one hour, the first antenna and the second antenna can be switched at every one hour, as the receiver antenna.

Figure 9:
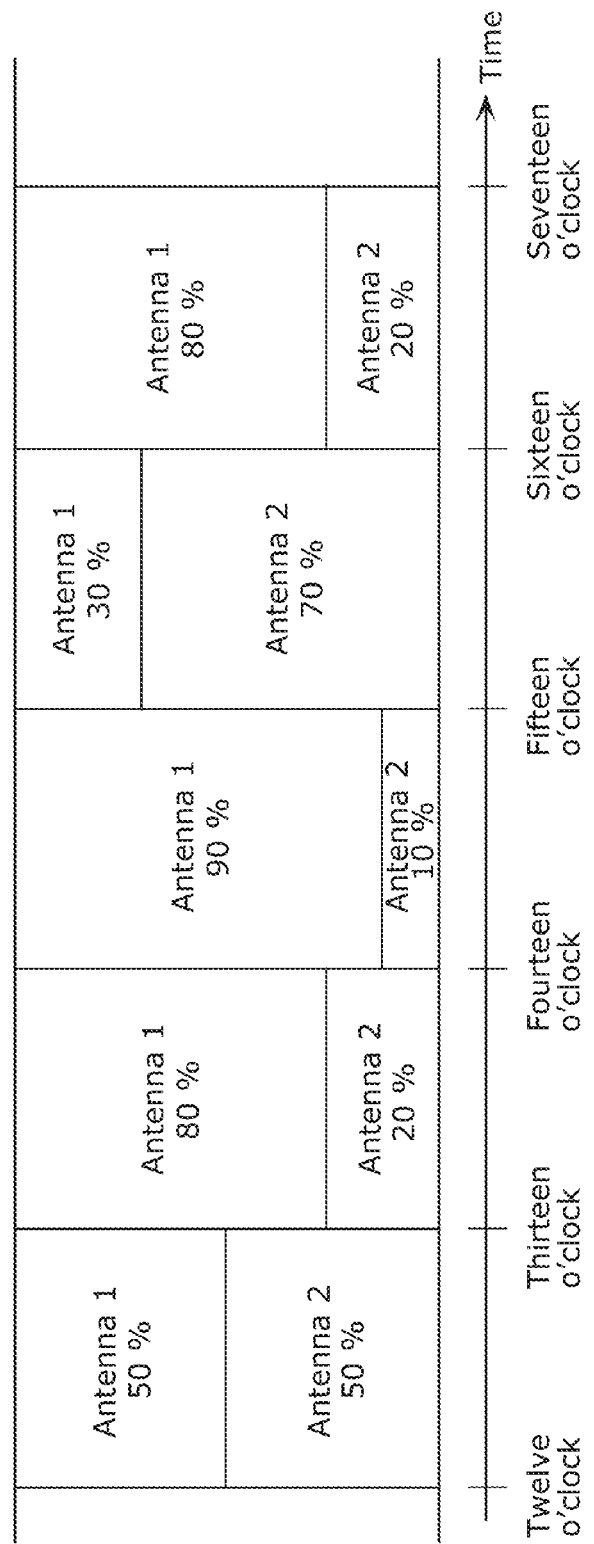
FIG. 9 is a diagram which shows time transition in the selection of the receiver antenna in the access point according to the embodiment.

FIG. 9 is a diagram which shows passage of time in the selection in the receiver antennas in the access point according to the embodiment. As shown in FIG. 9, increase and decrease in the communication data amount at an interval of one hour can be supported by switching the first antenna and the second antenna for every one hour. This further improves the reception ratio of the access point.

Although an example of the communication device having therein two receiver antennas is described in the present embodiment, the present invention can be applied to a communication device having therein three or more receiver antennas. For the occasion, the receiver antennas are switched among the three or more receiver antennas included in the communication device, based on the ratio of the numbers of the communication data items sent from communication terminals associated with each of the receiver antennas.

In the present embodiment, the first term for selecting the first antenna and the second term for selecting the second antenna are determined based on the ratio S indicating the number of times of the successful reception, and the first term and the second term are alternately repeated. In addition, if the first antenna or the second antenna is selected based on the probability indicated by the ratio S indicating the numbers of times of the successful reception for every interval T, the same effect can be obtained.

For example, if the number of times of the reception from the station optimal for the antenna 1 is seven while the number of times of the reception from the station optimal for the antenna 2 is three, the probability of the antenna 1 to be selected is 70% while the probability of the antenna 2 to be selected is 30%. The same effect can be obtained if the antenna control unit selects an antenna based on the above probability for every interval T.

It should be noted that the interval for switching between the receiver antennas in the access point may be a time period of retransmission latency for wireless communication.

In addition, upon determining the interval for switching between the receiver antennas, the interval for switching between the receiver antennas may be in a predetermined range. To be specific, a predetermined range is set for a ratio of intervals for switching between the receiver antennas. If the ratio calculated according to the present embodiment is out of the predetermined range, the ratio may be set in the predetermined range. Consideration is given, for more specific description, to the predetermined range which is determined by an upper limit value and a lower limit value. If the ratio calculated according to the present embodiment exceeds the upper value, the ratio should be matched with the upper limit value, while the ratio is below the lower limit value, the ratio should be matched with the lower limit value. With this, if a communication device having extremely-low communication frequency is used, a receiver antenna in the access point, with which communication device cannot communicate, is prevented from being fixed as the receiver antenna. This enables a terminal having extremely low communication frequency to implement communication in the same manner as terminals having communication frequencies other than the extremely low communication frequency do. It should be noted that the upper limit value or the lower limit value of the ratio can be determined using the number of times of retransmission. For example, if the ratio of switching between the antenna 1 and the antenna 2 is calculated as 1:100 in the present embodiment, the ratio can be 1:7 under the situation where the number of the times of the retransmission is seven. To be specific, when the number of the times of the retransmission is seven, the upper limit value of the ratio can be 0.875 (=7/(1+7)) while the lower limit value of the ratio can be 0.125 (=1/(1+7)). Accordingly, communication opportunities for the terminal having the extremely low communication frequency can be prevented from extremely reducing. It should be noted that the predetermined range may be determined by only one of the upper limit value and the lower limit value.

Details are described in the following.

Figure 10:
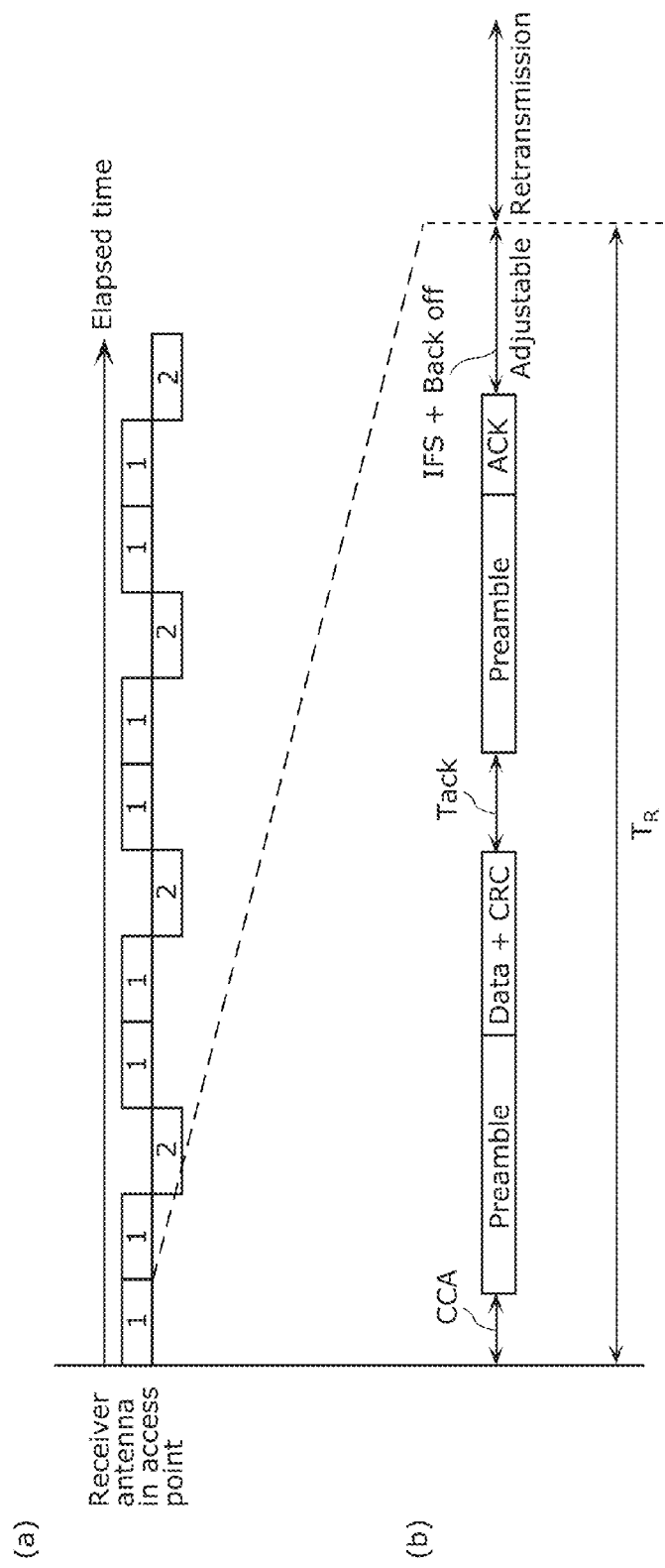
FIG. 10 is an explanatory diagram which shows intervals for switching in receiver antennas according to the embodiment.

FIG. 10 is an explanatory diagram which shows intervals for switching in the receiver antennas according to the embodiment. FIG. 10 includes (a) which shows an example of selection in the receiver antennas in the access point, which is the same with the case shown in FIG. 8. FIG. 10 also includes (b) which shows an example of a wireless signal (IEEE 802.15.4) to be sent and received upon sending communication data from the station to the access point.

As shown in (b) in FIG. 10, a station which is to send wireless signals first performs clear channel assessment (CCA) for searching a channel not in use in wireless communication channels. If the channel not in use is found by the CCA, the station sends a preamble in the wireless communication channel not in use, and continuously sends communication data and a CRC of the communication data. Upon receiving the communication data, the access point waits for a time period Tack, and then sends the preamble and subsequently an ACK message. This is an example of a wireless signal which is sent and received when the communication data is sent from the station to the access point.

In the case where the access point cannot receive the communication data due to communication loss or other factors, the source station waits for a time period which should have been required for completion of the sending of the ACK message, an inter frame space (IFS) time period, and a time period during which back-off time elapses, which should have occurred if the access point could have received the communication data. Then, the source station sends the communication data again (retransmission). A time period from a time when the communication data is first sent to a time when the communication data is retransmitted is set to a retransmission latency time $T_R$.

The effect obtained by allowing the interval for switching between the receiver antennas according to the present embodiment to be equal to the retransmission latency time $T_R$ is described with reference to FIG. 11A and FIG. 11B.

Figure 11A:
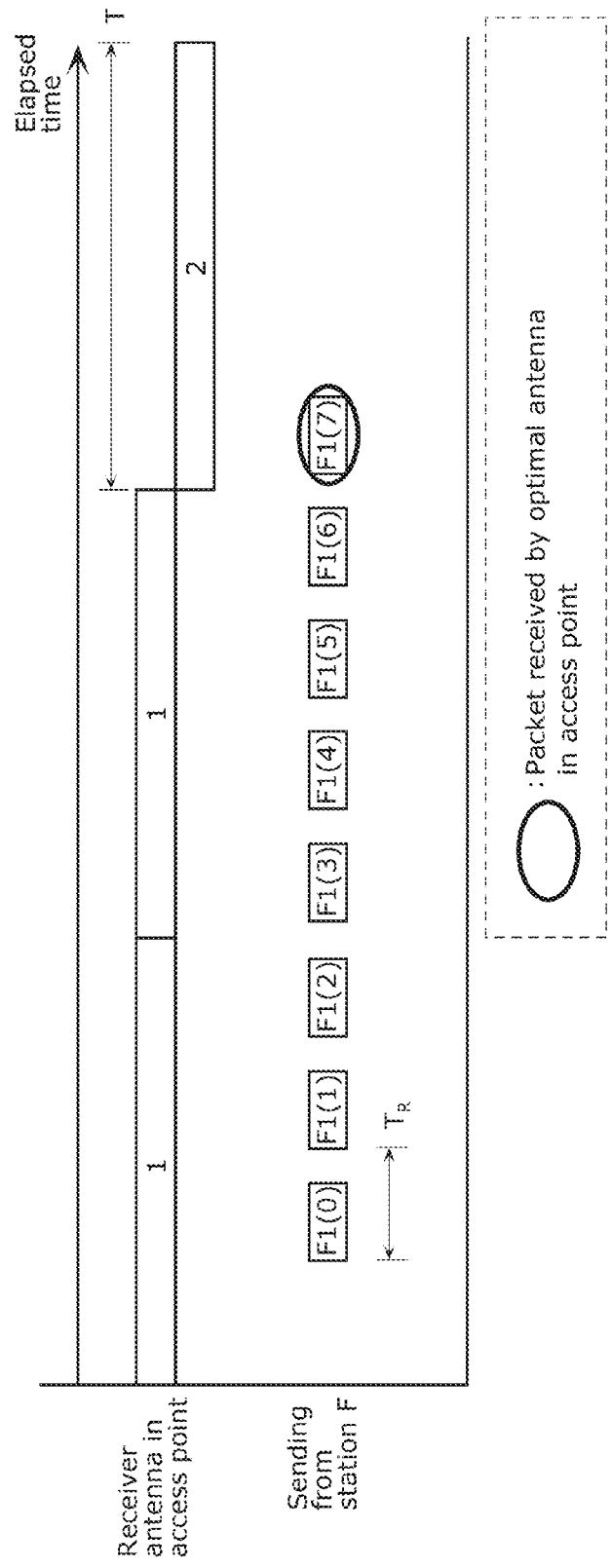
FIG. 11A is a diagram which shows an example of intervals for switching in the receiver antennas for describing problems to be solved in the present invention.

FIG. 11A is a diagram which shows an example of the intervals for switching in receiver antennas for describing problems to be solved in the present invention. Here, the interval T for switching in the receiver antennas is set to be 4 $T_R$ which is larger than $T_R$. The receiver antenna in the access point optimal for receiving wireless signals sent by the station F is the second antenna, and the first antenna in the access point is set to be incapable of receiving the wireless signal sent by the station F.

An example of a case is described where the station F sends communication data F1 (0) while the access point selects the first antenna as the receiver antenna. Here, reference numerals in parentheses indicate the number of times of the retransmission. The numerical value of 0 in a parenthesis indicates the first sending of the communication data (not retransmission).

Although the station sends F1 (0), the access point cannot receive the F1 (0). Accordingly, the station retransmits F1 (1) after the station has sent F1(0) and $T_R$ has elapsed. The access point cannot receive the F1 (1) either. Thus, the station F further retransmits F1 (2) to F1 (6). The access point cannot receive the F1 (2) to F1 (6) either. Thus, the station F further retransmits F1 (7). Here, the receiver antenna in the access point is switched to the second antenna. At the point when the F1 (7) is retransmitted, the receiver antenna in the access point is the second antenna. Accordingly, the access point can receive the retransmitted F1 (7). For the occasion, the retransmission is required seven times until the access point receives the communication data F1.

Figure 11B:
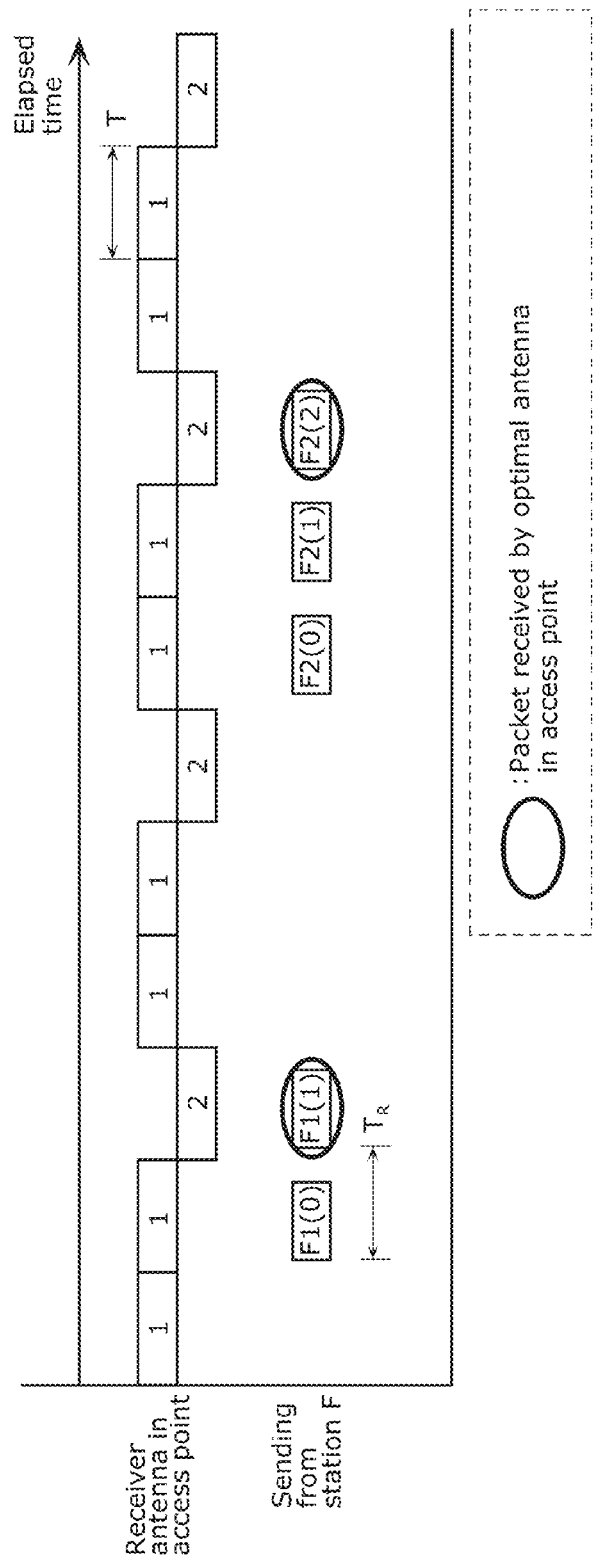
FIG. 11B is a diagram which shows an example of the intervals for switching in the receiver antennas according to the embodiment.

FIG. 11B is a diagram which shows an example of the intervals for switching in the receiver antennas according to the embodiment. Here, the interval T for switching in the receiver antennas is set to be $T_R$. Other conditions are the same with those in the case shown in FIG. 11A.

Although the station F sends F1 (0), the access point cannot receive the F1 (0). Accordingly, the station retransmits F1 (1) after the station has sent F1(0), and $T_R$ has elapsed. Here, the receiver antenna in the access point is switched to the second antenna. At the point when the F1 (1) is retransmitted, the receiver antenna in the access point is the second antenna. Accordingly, the access point can receive the retransmitted F1 (1). For the occasion, the retransmission is required once until the access point receives the communication data F1.

As described above, the interval for switching in the receiver antennas in the access point is set to the retransmission latency in the wireless communication, so that the time period can be reduced which is required for receiving, by the optimal receiver antenna, the communication data sent during a time period when the receiver antenna not optimal for communicating with the station is selected.

Typically, an upper limit is imposed for the number of times of the retransmission. If the number of times of the retransmission exceeds the upper limit, the communication data is not received by the access point, and the communication is lost. The time period required for the access point to receive the communication data using the optimal receiver antenna is shortened, thereby avoiding the aforementioned communication loss.

The interval T for switching in the receiver antennas may be updated according to the number of times of the successful reception of the communication data sent by a communication terminal. For example, if the reception ratio of the communication data sent by the communication terminal decreases under the condition that T is one hour, T may be changed to 10 minutes. This can suppress decreasing in the reception ratio of the communication data.

It should be noted that the interval T for switching between the receiver antennas may vary in the predetermined range for each of the intervals. For example, the predetermined range is set to 10% of T, and the T is set to ten minutes. Then, T may be nine minutes or 11 minutes in the interval. With this, if the station sends the communication data periodically, the decreasing in the reception ratio of the communication data can be suppressed, During receiving the wireless signal by one of the receiver antennas in the access point, the receiver antennas may not be switched. To be specific, during a time period in which a wireless signal is received by one of the receiver antennas in the access point, the selection in the receiver antennas by the selection unit 4 may be kept (not be changed). With this, communication loss occurring at the switching in the receiver antennas during receiving wireless signals can be avoided.

As desried above, in the communication device according to an aspect of the present invention, the communication device (access point) determines respective time periods during which two receiver antennas are used so that the ratio of the time periods is equal to a ratio of the number of times in which the communication data from the communication terminals (stations) is successfully obtained. The ratio of the respective time periods for using the receiver antennas is coincident with the ratio of the number of terminals whose wireless signals are to be successfully received by the receiver antennas, thereby improving the ratio of successfully receiving communication data. Accordingly, the wireless signals can be received with high probability when the communication terminals send wireless signals at arbitrary timings.

Each of the communication terminals is associated with an antenna with a high RSSI among the receiver antennas, increasing possibility of receiving the wireless signals from each of the communication terminals using the antenna with the high RSSI. Accordingly, the wireless signals can be received with high probability when the communication terminals send wireless signals at arbitrary timings.

When the communication device is continuously employed, two receiver antennas can be used with being switched for the respective predetermined time periods under the condition that the respective time periods for using the two receiver antennas are set to the aforementioned ratio. Thus, the effect of the present invention can be continuously exerted.

If a communication terminal whose communication data amount significantly varies in time is used, the receiver antenna in the access point can be selected according to the variation in a communication data amount of the communication terminal.

If the communication data sent by the station can be received by one of the receiver antennas in the access point, a selection ratio in the receiver antennas in the access point is determined based on the communication data amount of the station. In other words, only the station requiring the selection in the receiver antennas in the access point can be included in calculation of the selection ratio in the receiver antennas in the access point.

If the communication data sent by the station can be received by all of the receiver antennas in the access point, a selection ratio in the receiver antennas in the access point can be determined regardless of the communication data amount of the station. In other words, only the station requiring the selection in the receiver antennas in the access point can be included in the calculation of the selection ratio of the receiver antennas in the access point.

The receiver antenna with a higher RSSI can be used at every interval for switching between the receiver antennas. In other words, even in a case where the RSSI temporally varies, such as a case where the station moves, or a case where a peripheral communication environment varies though the station is at rest, the access point can select the receiver antenna optimal for the receiving.

If the access point does not select the optimal receiver antenna for receiving communication data sent by a station when the station sends the communication data, and thus the communication data cannot be received, a time period until retransmitted communication data can be received is shortened by switching in the receiver antennas in the access point. Thus, the probability that the access point can receive the communication data from the station can be increased.

Communication loss occurring at the switching in the receiver antennas during receiving wireless signals can be avoided, Each of the structural elements in each of the above-described embodiments may be configured in the form of an exclusive hardware product, or may be realized by executing a software program suitable for the structural element. Each of the structural elements may be achieved by means of a program executing unit, such as a CPU and a processor, reading and executing the software program recorded on a recording medium such as a hard disk or a semiconductor memory. Here, the software program for achieving the communication device according to each of the embodiments is a program described below.

The program causes a computer to execute a communication method for use in a communication device including a first antenna and a second antenna for receiving wireless signals which contain communication data and are sent by a plurality of communication terminals, the communication method including: selecting the first antenna in a first term, and the second antenna in a second term different from the first term; determining whether or not the communication data contained in the wireless signals received by a selected one of the first antenna and the second antenna selected in the selecting is successfully obtained; and associating each of the communication terminals with one of the first antenna and the second antenna, in which in the selecting, with reference to association in the associating, a length of the first term and a length of the second term are set to make a ratio of the length of the second term to the length of the first term equal to a ratio of the number of times the communication data sent by the communication terminal associated with the second antenna is determined to be successfully obtained, to the number of times the communication data sent by the communication terminal associated with the first antenna is determined to be successfully obtained.

The communication device according to one or a plurality of aspects of the present invention is described based on the embodiment. The present invention, however, is not limited to the embodiment. Various modifications conceivable by a person skilled in the art or arbitral combinations of structural components in the embodiment may be included in one or a plurality of aspects of the present invention as long as the modifications or the combinations do not depart from the scope of the present invention.

INDUSTRIAL APPLICABILITY

The present invention can provide a communication device and the so on with which wireless signals can be received with high provability when a communication partner sends the wireless signals at arbitrary timings, in a receiver antenna diversity technique. The communication device can be used in a domestic wireless network, an intra-company wireless network, a public wireless network, such as a mobile telephone, or other networks.

REFERENCE SIGNS LIST

1 Communication device
2 First antenna
3 Second antenna
4 Switch unit
5 Demodulation unit
6 Reception determination unit
7 Storage unit
8 Counter
9 Antenna control unit
100, 200 Communication system
101, 220 Access point
111 Station A
112 Station B
113 Station C
114 Station D
210 Domestic network
230 Photovoltaics
240 Storage battery
250 Fuel cell 4
260 Air conditioner
270 Television

The invention claimed is:
1. A communication device comprising:
a first antenna and a second antenna which receive wireless signals sent by a plurality of communication terminals, the wireless signals containing communication data;
a selection unit configured to select the first antenna in a first term, and the second antenna in a second term different from the first term;
a reception determination unit configured to determine whether or not the communication data contained in the wireless signals received by a selected one of the first antenna and the second antenna selected by the selection unit is successfully obtained; and
a storage unit which stores association between each of the communication terminals and one of the first antenna and the second antenna,
wherein the selection unit is configured to set a length of the first term and a length of the second term by referring to the association, the length of the first term and the length of the second term being set to make a ratio of the length of the second term to the length of the first term equal to a ratio of the number of times the communication data sent by the communication terminal associated with the second antenna is determined to be successfully obtained, to the number of times the communication data sent by the communication terminal associated with the first antenna is determined to be successfully obtained.

2. The communication device according to claim 1, further comprising
a received signal strength indicator (RSSI) detection unit configured to detect RSSIs of the wireless signals received by the respective first antenna and the second antenna,
wherein the storage unit stores the association between the communication terminal which is a source terminal for sending a wireless signal and one of the first antenna and the second antenna that receives a wireless signal having a higher one of the RSSIs detected by the RSSI detection unit.

3. The communication device according to claim 2,
wherein the selection unit is configured to, when one of the RSSIs of the wireless signals received by one of the first antenna and the second antenna is lower than a predetermined value, set the length of the first term and the length of the second term based on the number of times that the communication data sent by the source terminal for sending the wireless signal is determined to be successfully obtained.

4. The communication device according to claim 2,
wherein the selection unit is configured to, when one of the RSSIs of the wireless signals received by the respective first antenna and the second antenna is higher than or equal to a predetermined value, set the length of the first term and the length of the second term without including the number of times that the communication data sent by the source terminal for sending the wireless signal is determined to be successfully obtained.

5. The communication unit according to claim 2,
wherein the storage unit is configured to store, as new association, the association between the communication terminal and one of the first antenna and the second antenna that receives the wireless signal which has the higher one of the RSSIs, upon receiving the communication data sent by the communication terminal.

6. The communication device according to claim 1,
wherein the selection unit is configured to repeat the first term and the second term in a cycle.

7. The communication device according to claim 6,
wherein the selection unit is configured to update a repeat cycle for the first term and the second term, based on the number of times that the communication data sent by the communication terminal associated with the first antenna is determined to be successfully obtained and the number of times that the communication data sent by the communication terminal associated with the second antenna is determined to be successfully obtained.

8. The communication device according to claim 6,
wherein the selection unit is configured to set the length of the first term and the length of the second term under a condition that retransmission latency for the communication terminal to retransmit the communication data is set as a repeat cycle.

9. The communication device according to claim 1, wherein the selection unit is configured to keep selection of the first antenna or selection of the second antenna during reception of the wireless signals by the first antenna or the second antenna.

10. A communication method for use in a communication device including a first antenna and a second antenna for receiving wireless signals which contain communication data and are sent by a plurality of communication terminals, the communication method comprising:

selecting the first antenna in a first term, and the second antenna in a second term different from the first term;

determining whether or not the communication data contained in the wireless signals received by a selected one of the first antenna and the second antenna selected in the selecting is successfully obtained; and associating each of the communication terminals with one of the first antenna and the second antenna, wherein in the selecting, with reference to association in the associating, a length of the first term and a length of the second term are set to make a ratio of the length of the second term to the length of the first term equal to a ratio of the number of times the communication data sent by the communication terminal associated with the second antenna is determined to be successfully obtained, to the number of times the communication data sent by the communication terminal associated with the first antenna is determined to be successfully obtained.

11. A non-transitory computer-readable recording medium which records a program causing a computer to execute the communication method according to claim 10.

\* \* \* \* \*